(12) United States Patent
    Jiao et al.

(10) Patent No.: US 11,600,174 B2
(45) Date of Patent: Mar. 7, 2023

(54) SYSTEMS AND METHODS FOR AUTONOMOUS ROAD CONDITION REPORTING

(71) Applicant: Pony AI Inc.

(72) Inventors: Jialin Jiao, South San Francisco, CA (US); Jing Zhai, Fremont, CA (US)

(73) Assignee: Pony A1 Inc., Grand Cayman (KY)

( * ) Notice: Subject to any disclaimer, the term of this patent is extended or adjusted under 35 U.S.C. 154(b) by 481 days.

(21) Appl. No.: 16/518,823

(22) Filed: Jul. 22, 2019

(65) Prior Publication Data
    US 2021/0027622 A1    Jan. 28, 2021

(51) Int. Cl.
    *G08G 1/09*       (2006.01)
    *G08G 1/01*       (2006.01)
    *G05D 1/00*       (2006.01)
    *G06Q 20/10*      (2012.01)

(52) U.S. Cl.
    CPC ............. *G08G 1/091* (2013.01); *G06Q 20/10* (2013.01); *G08G 1/0112* (2013.01); *G05D 1/0088* (2013.01); *G05D 2201/0213* (2013.01)

(58) Field of Classification Search
    CPC ...... G08G 1/091; G08G 1/0112; G06Q 20/10; G05D 1/0088; G05D 2201/0213
    See application file for complete search history.

(56) References Cited

U.S. PATENT DOCUMENTS

| | | | |
|---|---|---|---|
| 6,615,133 B2 | 9/2003 | Boies et al. | |
| 6,615,648 B1 | 9/2003 | Ferguson et al. | |
| 7,421,334 B2 * | 9/2008 | Dahlgren | G01C 21/3691 |
| | | | 701/408 |
| 8,880,324 B2 | 5/2014 | Chapman et al. | |
| 9,310,215 B2 | 4/2016 | Zhao et al. | |
| 9,881,384 B2 * | 1/2018 | Ponder | G06K 9/0063 |
| 10,048,700 B1 * | 8/2018 | Curlander | G08G 1/164 |
| 10,872,433 B2 * | 12/2020 | Stein | G06V 20/58 |
| 2014/0160295 A1 * | 6/2014 | Kyomitsu | G08G 1/0112 |
| | | | 340/905 |
| 2018/0011485 A1 * | 1/2018 | Ferren | G05D 1/0061 |
| 2019/0202476 A1 * | 7/2019 | Tao | B60W 30/095 |

FOREIGN PATENT DOCUMENTS

CN    109344219 A  *  2/2019  .......... G06Q 50/265

* cited by examiner

*Primary Examiner* — Aniss Chad
*Assistant Examiner* — Christine Nguyen Huynh

(57) ABSTRACT

Apparatuses, methods, and computer readable storage media are provided for autonomously reporting road conditions. The apparatus can be operated by using one or more sensors by a detecting vehicle to detect a road condition. A computer can then identify the road condition using a component and generating a road condition information. The computer can then determine an effect of the road condition on other vehicles and determine a subset of the other vehicles that will be affected by the road condition. The computer can then transmit the road condition information such that the road condition information is receivable by the subset of other vehicles.

20 Claims, 11 Drawing Sheets

SYSTEMS AND METHODS FOR AUTONOMOUS ROAD CONDITION REPORTING

FIELD OF THE INVENTION

This disclosure relates to an autonomous road condition reporting methods and systems.

BACKGROUND

Adverse conditions on streets and roads are often observed long before the adverse condition causes an accident or cleaned up. However, an adverse road condition seen from one vehicle is often not conveyed to another vehicle. The advanced safety systems of vehicles largely do not communicate safety information to other vehicles. There is a need in the art for vehicles to automatically inform one another of adverse road conditions. And there is a need in the art for vehicles to automatically inform maintenance vehicles of adverse road conditions so that the road conditions are quickly identified and improved.

SUMMARY

The present disclosure includes methods for autonomously reporting adverse road conditions. In an exemplary embodiment, a method includes detecting a road condition, using one or more sensors by a detecting vehicle. The method includes identifying the road condition using a component and generating a road condition information. The method then includes determining an effect of the road condition on other vehicles. The method includes determining a subset of the other vehicles that will be affected by the road condition and then transmitting the road condition information such that the road condition information is receivable by the subset of other vehicles. The method may further include determining a lane of the road condition and determining at least one of a size or a severity of the road condition. The method further includes determining the subset of the other vehicles based at least on one of a proximity of the other vehicles to the road condition, the effect of the road condition on the other vehicles, and the ability of the other vehicles to improve the road condition. The road condition may include at least one of a debris, a dysfunctional sign, or a decaying infrastructure. The method further includes generating road condition information that includes instructions to improve the road condition and a picture of the road condition and further includes receiving a confirmation from at least one of the other vehicles. The instructions may further include an instruction to change the velocity of one of the other vehicles as the one other vehicle approaches the road condition. The road condition information may further include a road condition density of the road condition with other road conditions based on the location of the road condition and the location of other road conditions where the subset of other vehicles is selected based on a payment received from the other vehicles.

In an exemplary embodiment, an apparatus includes one or more sensors on a detecting vehicle configured to detect a road condition, a computer configured to identify the road condition and generate a road condition information and to determine an effect of the road condition on other vehicles. The computer is further configured to determine a subset of the other vehicles that will be affected by the road condition. The detecting vehicle is further configured to transmit the road condition information such that the road condition information is receivable by the subset of other vehicles. The computer may be further configured to determine a lane of the road condition and determine at least one of a size or a severity of the road condition. The computer may be further configured to determine the subset of the other vehicles based at least on one of a proximity of the other vehicles to the road condition, the size of the effect of the road condition on the other vehicles, and the ability of the other vehicles to improve the road condition. The computer may be further configured to identify road conditions that include at least one of a debris, a dysfunctional sign, or a decaying infrastructure. The road condition generated by the computer may further include instructions to improve the road condition and a picture of the road condition. The computer may be further configured to receive a confirmation from at least one of the other vehicles. The road condition generated by the computer may further include an instruction to change the velocity of one of the other vehicles as the one other vehicle approaches the road condition. The road condition generated by the computer may further include a density of the road condition with other road conditions based on the location of the road condition and the location of other road conditions and the subset of other vehicles may be selected based on a payment received from the other vehicles.

Another general aspect is a computer readable storage medium in a detecting vehicle having data stored therein representing software executable by a computer, the software comprising instructions that, when executed, cause the detecting vehicle to detect, using one or more sensors, a road condition. The software instructions further cause a computer to identify the road condition using a component and generating a road condition information, determine an effect of the road condition on other vehicles, and determine a subset of the other vehicles that will be affected by the road condition. The software instructions further cause a computer to transmit the road condition information such that the road condition information is receivable by the subset of other vehicles. Determining the effect of the road condition on other vehicles may further include determining a lane of the road condition and further include determining at least one of a size or a severity of the road condition. The software instructions may further include selecting the subset of other vehicles based on at least one of a proximity of the other vehicles to the road condition, the size of the effect of the road condition on the other vehicles, and the ability of the other vehicles to improve the road condition. The generated road condition information may further include instructions to improve the road condition and a picture of the road condition. The software instructions may further include receiving a confirmation from at least one of the other vehicles. The instructions to improve the road condition may further include an instruction to change the velocity of one of the other vehicles as the one other vehicle approaches the road condition. The software instructions to generate a road condition information may further include generating a density of the road condition with other road conditions based on the location of the road condition and the location of other road conditions where the subset of other vehicles is selected based on a payment received from the other vehicles.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the present disclosure are utilized, and the accompanying drawings of which:

DETAILED DESCRIPTION

The disclosed subject matter describes a system and method for providing information from a vehicle on road maintenance for the benefit of both individual drivers and the public. The vehicle uses sensors to identify road conditions. The road conditions may be lane specific traffic information such as traffic jams and vehicle accidents. The road conditions may also be maintenance related issues. Examples of maintenance related issues are potholes in the road, broken street signs, dysfunctional traffic signs, and cracked bridge fences.

Once road conditions are identified, the road conditions are shared with other vehicles. The sharing of road conditions may comprise cross-talking between nearby other vehicles to transmit traffic information or asking a vehicle to yield when changing lanes. Road conditions may also be shared with road repair entities such as municipal transportation authorities, local/federal government department(s) that is responsible for maintaining/repairing traffic/transportation device/facility/infrastructure. Road maintenance can be confirmed between vehicles. Additionally, instructions on how to effectuate the road maintenance may be transmitted by the vehicle that identifies the road condition.

Figure 1:
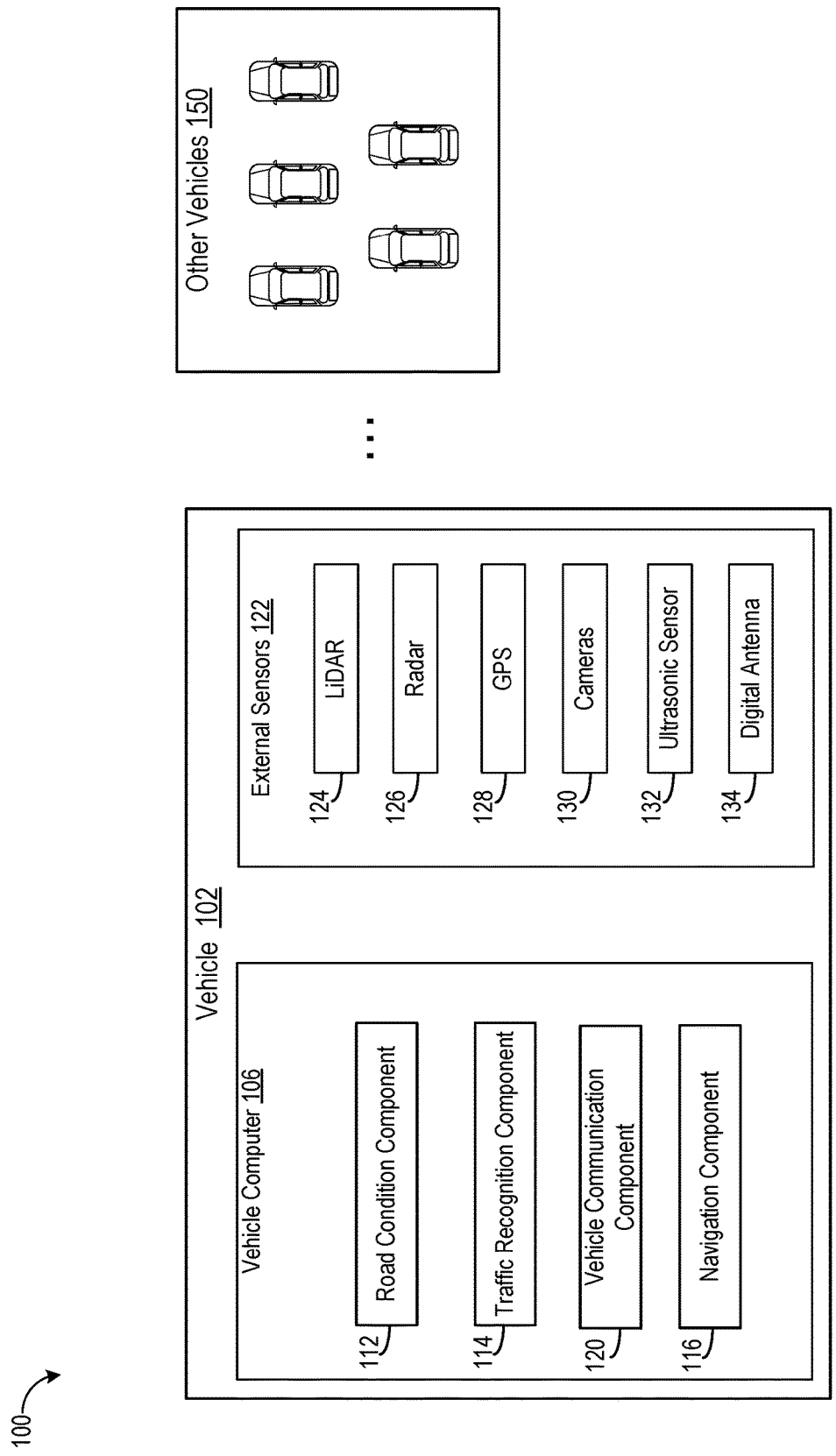
FIG. 1 is a schematic illustrating the components that may be used in an autonomous road condition reporting system.

Referring to FIG. 1, FIG. 1 is a schematic 100 illustrating the components that may be used in an autonomous road condition reporting system. The vehicle 102 may be any vehicle that can navigate manually or autonomously from one location to another location. Possible examples of the vehicle 102 are cars, trucks, buses, motorcycles, scooters, hover boards, and trains. Road conditions are identified and transmitted from a vehicle 102. The vehicle 102 includes a vehicle computer 106 and external sensors 122.

The vehicle computer 106 may be any computer with a processor, memory, and storage, that is capable of receiving data from the vehicle 102 and sending instructions to the vehicle 102. The vehicle computer 106 may be a single computer system, may be co-located, or located on a cloud-based computer system. The vehicle computer 106 may be placed within the vehicle 102 or may be in a different location from the vehicle 102. In some embodiments, more than one vehicle 102 share a single vehicle computer 106. The vehicle computer 106 identifies road conditions, recognizes traffic conditions, directs communication with other vehicles 150, and in some embodiments, operates the navigation of the vehicle 106. The vehicle computer 106 includes a road condition component 112, a traffic recognition component 114, a navigation component 116, and a vehicle communication component 120. In one embodiment, the vehicle 102 is driven autonomously. The autonomous vehicle 102 is operated by a navigation component 116 in this embodiment. Other vehicles 150 represent all vehicles other than the vehicle 102.

The road condition component 112 uses data from external sensors 122 to identify road conditions. The road condition component 112 may be a computer with a processor, memory, and storage. The road condition component 112 may share a processor, memory, and storage with the vehicle computer 106 or may comprise a different computing system. A road condition may be any state of the road including potholes, traffic congestion, vehicles on the road, objects on the road, objects on the side of the road, signs, traffic signals, or any object, animal, or thing that has an effect on the drivability of a road. Once a road condition is identified, the road condition information may be shared with other vehicles 150.

In one embodiment, an effect of the road condition on other vehicles 150 is determined by the road condition component 112. The effect of the road condition on other vehicles 150 may be predetermined by the identity of the road condition. For example, a pothole, with width, length, and depth, road condition may be predetermined to have a set effect on vehicles of a certain type. The types of vehicles may be differentiated by any variable associated with vehicles. Examples of some vehicle variables may be weight, ground clearance, wheel size, and braking distance.

In an exemplary embodiment, the effect of the road condition on other vehicles 150 is determined based on an approximation by the road condition component 112. For example, the road condition component 112 may approximate the future position of moving debris on the road. An example of moving debris is a package dropped by another vehicle that may have forward momentum from the vehicle that dropped the package. Another example of moving debris is debris that is likely to move. The road condition component 112 may approximate a future position of debris or calculate a probability of the of the debris moving based on the characteristic of the debris and the likelihood of the debris being hit by vehicles on the road. For example, small sharp pieces of metal on the road are likely to move even if they are currently stationary and at rest if vehicles on the road are likely to hit the small sharp pieces of metal. Once the road condition component 112 approximates a future position of the debris, the road condition component 112 may determine an effect on other vehicles 150 based on the approximated future position of the debris. In another example of this embodiment, the road condition component 112 may approximate the change of a road condition based on environmental conditions. The road condition component may approximate a crack in the road or a pothole to get larger during raining environmental conditions. The effect of the larger crack in the road or larger pothole on other vehicles 150 may, in turn, be larger based on the approximation that the road conditions would change based on the raining environmental conditions.

The road condition component 112 determines a subset of other vehicles 150 that will be affected by the road condition. Any criteria may be used by the road condition component 112 to determine the subset of other vehicles. In one embodiment, the subset of other vehicles 150 is determined based on the effect of the road condition on the other vehicles 150. In an exemplary embodiment, the subset of other vehicles is determined based on a payment received from the other vehicles 150.

Some road conditions will have a similar effect on almost all types of vehicles. For example, the effect of a broken sign for all vehicles 102 is that the information in the sign may not be visible to the other vehicles 150. In another example the effect of debris that completely blocks a lane will have the effect of eliminating the option of other vehicles 150 to drive in that lane. However, the effect of other vehicles 150 hitting debris will have a different effect based on the type of vehicle.

The traffic recognition component 114 uses data from external sensors 122 to determine the extent to which vehicles on the road reduce the velocity of other vehicles. The traffic recognition component 114 may be a computer with a processor, memory, and storage. The traffic recognition component 114 may share a processor, memory, and storage with the vehicle computer 106 or may comprise a separate computing system. In one embodiment, the traffic recognition component 114 compares predetermined speeds for locations to the current speed of other vehicles 150, if any, at the location. The unimpeded vehicle speed for every location is preset. The unimpeded speed is then compared to the observed speed of the vehicle 102 or other vehicles 150 at the location. The amount of traffic speed reduction is then calculated for that location. Other embodiments for determining the amount of traffic by a vehicle 102 may be envisioned. The disclosed subject matter is not limited to the embodiment herein.

The vehicle communication component 120 sends instructions, that when executed, transmit information that will be received by other vehicles 150. The vehicle communication component 120 may be a computer with a processor, memory, and storage. The vehicle communication component 120 may share a processor, memory, and storage with the vehicle computer 106 or may comprise a different computing system. The vehicle communication component 120 may also analyze information received by the vehicle 102. Road condition information may be shared by transmitting data through the vehicle communication component 120. The vehicle communication component 120 may selectively communicate road condition information with a subset of other vehicles 150. In one embodiment of selectively communicating road condition information to a subset of other vehicles 150, transmissions are sent with preconditions, such that other vehicles 150 that meet the preconditions, accept the transmission and other vehicles 150 that do not meet the preconditions ignore the transmission. In an example of this embodiment, a transmission is sent with the precondition of a ground clearance of less than ten inches. The other vehicles 150 that receive the transmission will ignore the transmission if their ground clearance is greater than ten inches. In an exemplary embodiment of selectively communicating road condition information to a subset of other vehicles 150, the subset of other vehicles 150 are given a decryption key to decrypt encrypted transmissions. The vehicle communication component 120 may encrypt transmissions before the transmissions are sent, such that only the subset of other vehicles 150 may decrypt and read the transmission. In an example of this embodiment, road maintenance vehicles are given decryption keys for road conditions that require maintenance. Vehicles 102 driving on the road are given maintenance encryption keys such that the vehicles 102 driving on the road may encrypt transmissions that only maintenance vehicles with the decryption keys can decrypt.

The subset of other vehicles 150 may be selected based on any criteria. In one embodiment, the subset of other vehicles 150 is selected based on the proximity of the other vehicles 150 to the road condition. In this embodiment, only vehicles within a set distance of the road condition are sent the road condition information. In an exemplary embodiment, the subset of other vehicles 150 is selected based on the size of the effect of the road condition on the other vehicles 150. In one example of this exemplary embodiment, only vehicles with a wheel size smaller than a set diameter are sent a road information because the effect of a road condition is greater for other vehicles with small wheels. Also, in an exemplary embodiment, the subset of other vehicles 150 is selected based on the ability of the other vehicles 150 to improve the road condition. In an example of this embodiment, only waste pickup vehicles are sent information on a debris road condition. In another example of this embodiment, instructions to improve the road condition are sent with the road condition information. In an example of this embodiment, instructions to remove and replace a damaged road sign are sent to vehicles with the ability to remove and install road signs. Also in an exemplary embodiment, a density of road conditions is sent for each location. The density may be calculated in various ways. In one example, the density for each location is the sum of 1 divided by the distance of each road condition to the location. The density display may represent the concentration of a particular adverse road condition.

The navigation component 116 interprets data from external sensors 122 to operate the vehicle 102 and navigate from a location to another location. The navigation component 116 may be a computer with a processor, memory, and storage. The navigation component 116 may share a processor, memory, and storage with the vehicle computer 106 or may comprise a different computing system. The navigation component 116 determines location, observes road conditions, finds obstacles, reads signage, determines relative positioning to other vehicles 150 or moving objects, and interprets any other relevant events occurring external to the vehicle 122.

The external sensors 122 collect data from the environment outside the vehicle 102. In the exemplary embodiments, external sensors 122 include LiDAR 124, radar 126, GPS 128, cameras 130, ultrasonic (proximity) sensors 132, and digital antennas 134. Data collected from external sensors 122 can be interpreted by the road condition component 112 to detect and identify road conditions. Additionally, data from the external sensors 122 may be interpreted by the traffic recognition component 114 to recognize slow moving or blocking vehicles. Data collected from external sensors 122 may also be used by the navigation component 116 to determine where the vehicle 102 will drive.

The LiDAR 124 sensor on the vehicle 102 comprises an emitter capable of emitting pulses of light and a receiver capable of receiving the pulses of light. In an exemplary embodiment, the LiDAR 124 emits light in the infrared range. The LiDAR 124 measures distances to objects by emitting a pulse of light and measuring the time that the light takes to reflect back to the receiver. The LiDAR 124 can rapidly scan the environment outside the vehicle to generate a three-dimensional map of the surroundings of the vehicle 102. The shapes in the three-dimensional map may be used to detect and identify road conditions.

The radar 126 sensor, like the LiDAR 124, comprises an emitter and receiver. The radar 126 sensor emitter is capable of emitting longer wavelengths of light than the LiDAR 124 that are typically in the radio wave spectrum. In an exemplary embodiment, the radar 126 sensor emits a pulse of light at 3 mm wavelength. The longer wavelength light from radar 126 will go through some objects that LiDAR 124 pulses would reflect.

The vehicle global positioning system ("GPS") 128 receives a satellite signal from GPS satellites and can interpret the satellite signal to determine the position of the vehicle 102. The GPS 128 continually updates the position of the vehicle 102. The position of the vehicle 102, as determined by the GPS 128, may be used to determine the approximate position of road conditions that are identified by the road condition component 112. The navigation component 116 may also use GPS 128 data to aid in operating the vehicle 102.

Cameras 130 can capture image data from the outside of the vehicle 102. Image data may be processed by the road condition component 112 to detect and identify road conditions. The detection and identification of road conditions from camera 130 image data may be done in various way. In one embodiment, the components on the road condition component 112 are taught through machine learning to detect and identify road conditions. Previously taken images of road conditions may be used to teach the road condition component 112 to detect and identify road condition from camera 130 image data. Additionally, the cameras 130 can capture image data and send it to the navigation component 116. The navigation component 116 can process the image data of objects and other environmental features around the vehicle 102. In an exemplary embodiment, images from vehicle cameras 130 are used to identify broken street signs.

Data from ultrasonic sensors 132 may also be used to identify road conditions in the environment outside the vehicle 102. Ultrasonic sensors 132 detect objects by emitting sound pulses and measuring the time to receive those pulses. Ultrasonic sensors 132 can often detect very close objects more reliably than LiDAR 124, radar 126 or cameras 130.

Digital antennas 134 collect data from cell towers, wireless routers, and Bluetooth™ devices. Outside computer systems may transmit data about the outside environment. Such data may be collected by digital antennas 134 to aid in the identification of road conditions. In an exemplary embodiment, a digital antenna 134 collects data transmitted from a cell tower to aid in determining the position of road conditions without the GPS 128.

Figure 2:
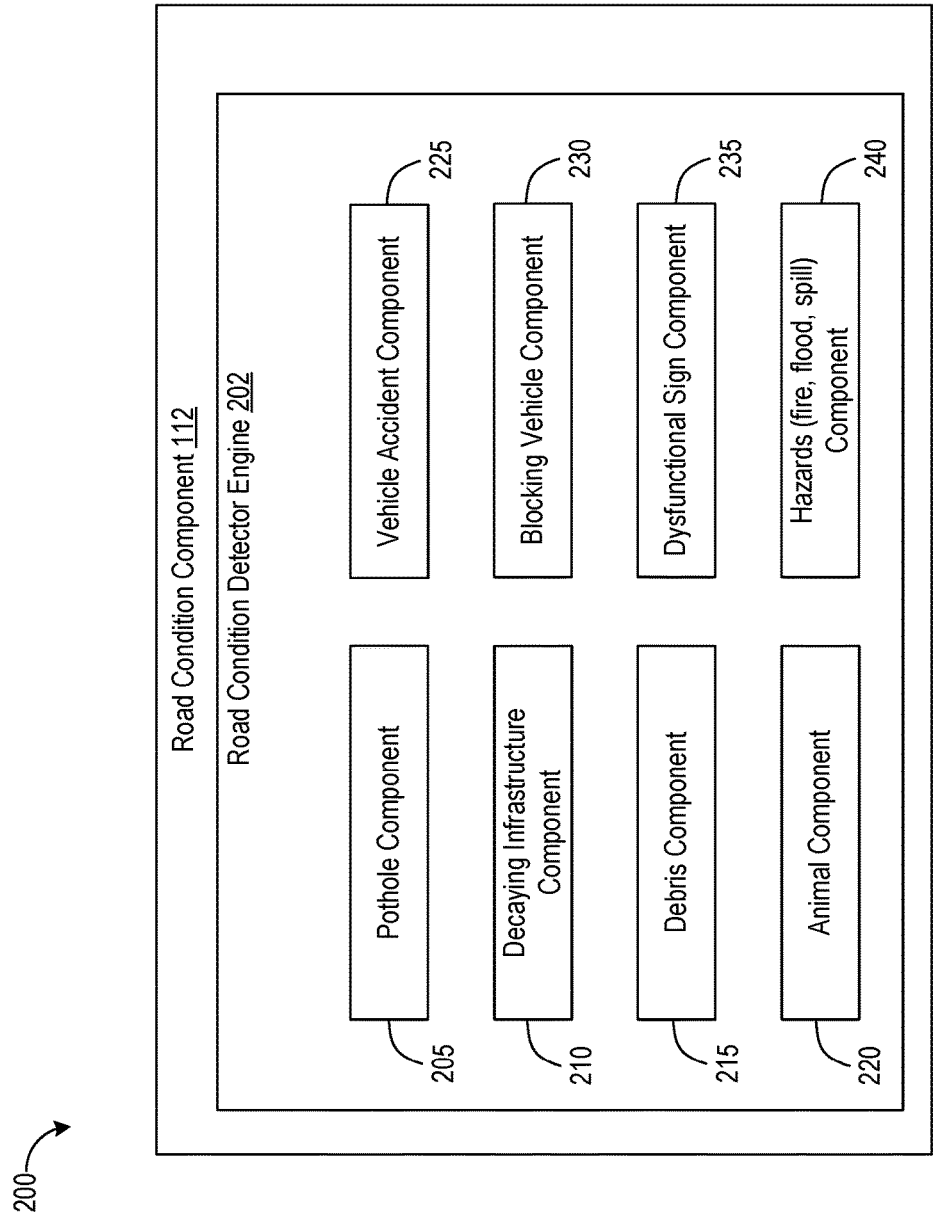
FIG. 2 is a schematic illustrating the components of the road condition component.

Referring to FIG. 2, FIG. 2 is a schematic 200 of the components of the road condition detection engine 202, which is a part of the road condition component 112. The components of the road condition detector engine 202 are configured to detect and identify various types of road conditions. There is no set number of road condition components in the road condition detector engine 202. Other embodiments of components in the road condition detector engine 202 may be implemented. The road condition detector engine 202 components include the pothole component 205, decaying infrastructure component 210, debris component 215, animal component 220, vehicle accident component 225, blocking vehicle component 230, and dysfunctional sign component 235.

The pothole component 205 of the road condition detector engine 202 is configured to detect a pothole, which may be an indentation in the road. The pothole indentation may have any length, width, and depth. The pothole component 205 may detect potholes by analyzing data from the external sensors 122 such as LiDAR 124. The data from a LiDAR 124 signal can be interpreted to identify potholes by observing a sudden depression in the road. Camera 130 data may also be used to detect potholes. In one embodiment, the pothole component 205 is trained by a machine learning algorithm to identify potholes from camera 130 images by observing a multitude of images of potholes. Potholes may also be detected by the pothole component 205 observing the jolt of the vehicle 102 as the vehicle 102 drives into potholes. The length, width, and depth of potholes may also be identified by the pothole component 205 if external sensor 122 data is precise enough to measure the pothole dimensions. Pothole road condition information may be transmitted to other vehicles 150 by the vehicle communication component 120. The pothole information may contain the location of the pothole, the lane of traffic, and the pothole dimensions of length, width, and depth. In one embodiment, a subset of other vehicles 150 is selected based on the other vehicles 150 that would be most likely to sustain damage by driving into the pothole. In an exemplary embodiment, a subset of other vehicles 150 is selected based on other vehicles 150 close in proximity to the pothole. Also, in an exemplary embodiment, a subset of other vehicles 150 is selected based on the ability of the other vehicles 150 to improve or eliminate the pothole in the road. The pothole information would then be transmitted to the subset of other vehicles 150.

The decaying infrastructure component 210 is used by the road condition detector engine 202 to detect and identify decaying infrastructure, which is any building, fence, bridge, sidewalk, or sign near a road that is in need of repair. The decaying infrastructure component 210 may identify decaying infrastructure based on data from the camera 130 external sensor. To identify decaying infrastructure from camera 130 image data, the decaying infrastructure component 210 may be trained by a machine learning algorithm to identify decaying infrastructure from camera 130 images by observing a multitude of images of decaying infrastructure. The observation of images of cracks in buildings, fences, bridges, and sidewalks may be used to identify decaying infrastructure. The effect of decaying infrastructure on other vehicles 150 may be determined by any criteria. In one embodiment, the effect on other vehicles 150 is predetermined based on settings in the other vehicles 150. For example, other vehicles 150 may be set to avoid unsightly buildings that have cracks in their walls. The effect on those other vehicles 150 would be greater than the effect on other vehicles 150 that do not have the setting to avoid unsightly buildings. In one embodiment, decaying infrastructure information is transmitted to a subset of vehicles based the ability of the vehicles to improve the decaying infrastructure. In one example of this embodiment, a broken bridge fence is identified by analyzing the image that shows a break or crack and information relating to the bridge fence is transmitted to maintenance vehicles.

The debris component identifies debris, trash, or other solid waste on or near a road. The debris component 215 of the road condition detector engine 202 may identify debris based on data from the camera 130 external sensor. To identify debris from camera 130 image data, the debris component 215 may be trained by a machine learning algorithm to identify debris from camera 130 images by observing multiple images of various types of debris and matching the currently observed debris with previously identified debris. The effect of debris on other vehicles 150 may be determined by any criteria. In one embodiment, the effect of the debris may be determined by the size of the debris and whether the debris is blocking traffic. In one embodiment, a subset of other vehicles 150 is determined by the other vehicles 150 that have a setting enabled to avoid debris or other adverse road conditions on the road.

The animal component 220 identifies living or dead animals of any kind on or near a road. The animal component 220 of the road condition detector engine 202 may identify animals based on data from the LiDAR 124, radar 126, camera 130, or ultrasonic sensor 132. To identify animals from camera 130 image data, the animal component 220 may be trained by a machine learning algorithm to identify animals from camera 130 images by observing multiple images of various types of animals. Animals may also be identified from LiDAR 124, radar 126, and ultrasonic sensor 132 data by the shape of scanned animals. The effect of animals on other vehicles 150 may be determined by the type of animal, the size of the animal, the speed of the animal, and whether the animal is dead or alive. In one embodiment, a subset of other vehicles 150 selected to receive a transmission of animal information is selected based on the other vehicles 150 that have a setting enabled to avoid the sight of dead animals.

The vehicle accident component 225 identifies vehicles on or near the road that have been involved in accidents. Vehicle accidents may be identified based on data from the cameras 130 or external sensor 122. To identify vehicle accidents from cameras 130 image data, the vehicle accident component 225 may be trained by a machine learning algorithm to identify vehicle accidents from camera 130 images by observing multiple images of a multitude of vehicle accidents. The effect of vehicle accidents on other vehicles 150 may be determined by the lanes blocked by the vehicle accident and the other vehicles 150 that are capable of cleaning up the accident. In one embodiment, the subset of other vehicles 150 that are transmitted vehicle accident information, which was generated by the road condition component, is limited to other vehicles 150 that are capable of cleaning up the vehicle accident.

The blocking vehicle component 230 identifies vehicles that slow the speed of traffic to below the unimpeded speed of a road. The unimpeded speed of a road is a predetermined speed that one vehicle will drive on a road without any objects or vehicles blocking the one vehicle. A blocking vehicle may be moving or stationary. In some embodiments, a blocking vehicle may be slow moving vehicular traffic. A blocking vehicle may be a train that is blocking a train crossing. The blocking vehicles may, in many cases, also be a vehicle accident if the vehicle in the accident is blocking the road. The blocking vehicle component 230 may identify blocking vehicles based on data from the LiDAR 124, radar 126, cameras 130, and ultrasonic sensor 132. To identify vehicle accidents from camera 130 image data, the blocking vehicle component 230 may be trained by a machine learning algorithm to identify blocking vehicles from camera 130 images by observing multiple images of blocking vehicles. Blocking vehicles may also be identified by data from LiDAR 124, radar 126, and ultrasonic sensor 132 that shows the shape of scanned blocking vehicles. The effect of blocking vehicles on other vehicles 150 may be determined by whether the blocking vehicle will slow down the other vehicles 150. In one embodiment, a subset of other vehicles 150 that are transmitted the blocking vehicle road condition are selected based on the direction of travel of the other vehicle.

The dysfunctional sign component 235 identifies broken signs and electronic signs that are not working as intended. Dysfunctional signs may be identified from camera 130 image data. To identify dysfunctional signs from camera 130 image data, the dysfunctional sign component 235 may be trained by a machine learning algorithm to identify dysfunctional signs from camera 130 images by observing multiple images of various dysfunctional signs. One example of a dysfunctional sign is a stoplight that is not receiving power. The effect of a dysfunctional sign on other vehicles 150 may be determined by whether the dysfunctional sign should be visible to the other vehicles 150 or whether the other vehicle has the ability to fix the sign. In one embodiment, the subset of other vehicles 150 that are selected to receive the road condition information are selected based on the direction of travel of the other vehicle 150.

The hazards component 240 identifies fires, floods, or chemical spills that are on or near a road. Hazards may be identified from camera 130 image data. To identify hazards from camera 130 image data, the hazards component 240 may be trained by a machine learning algorithm to identify hazards from camera 130 images by observing multiple images of various hazards. The effect of a hazard on other vehicles 150 may be determined by whether the other vehicle 150 can safely navigate through the hazard or whether the other vehicle 150 has the ability to fix the hazard. In one example of a flood water hazard, the effect on the other vehicle 150 is determined by the ground clearance of the other vehicle 150 and whether the other vehicle 150 may navigate through the flood water without floating. In one embodiment, a subset of other vehicles 150 that are selected to receive the road condition information are selected based on the direction of travel of the other vehicle 150.

Figure 3:
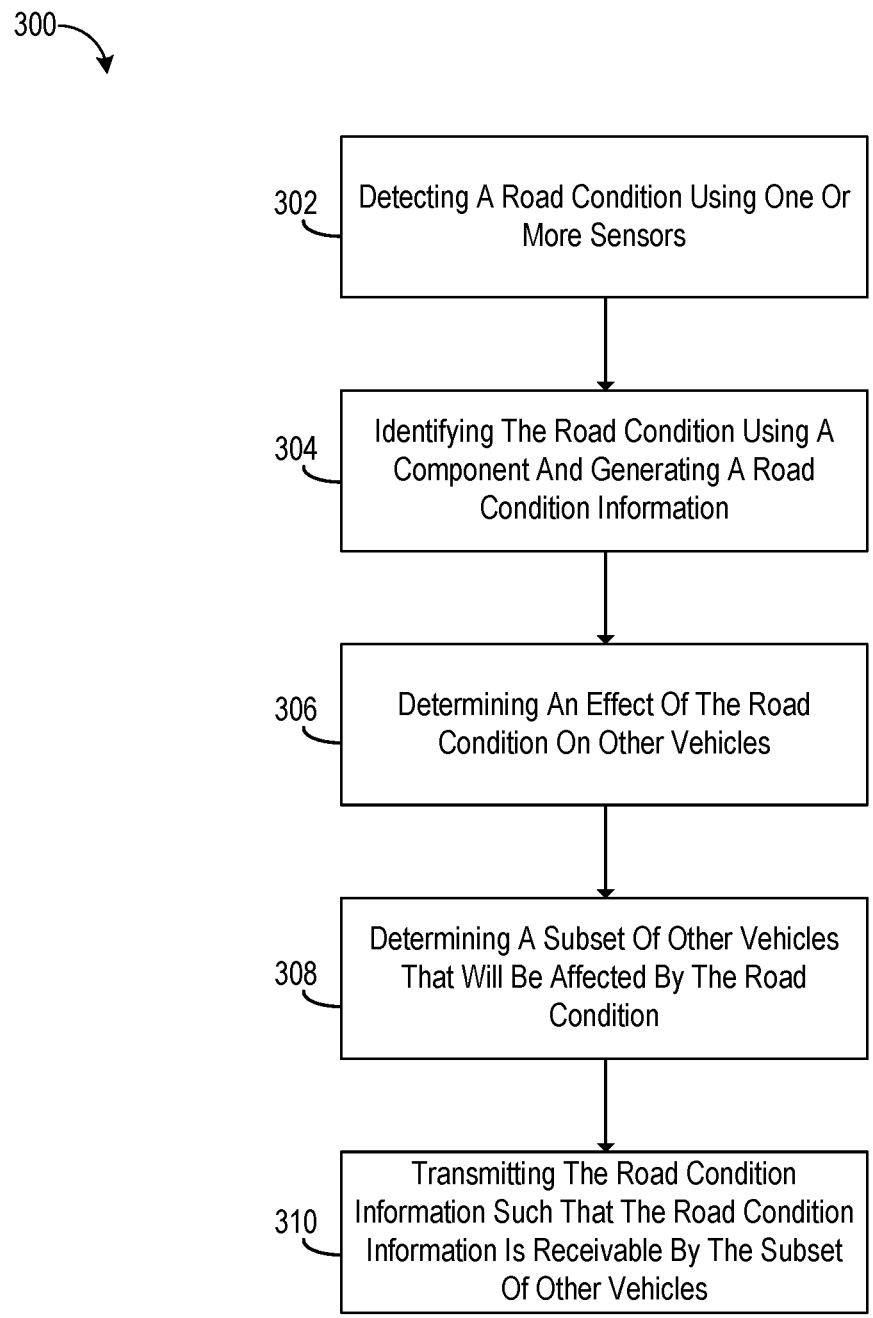
FIG. 3 is a flow diagram of a process for informing other vehicles of a road condition.

Referring to FIG. 3, FIG. 3 is a flow diagram 300 of a process for informing other vehicles 150 of an adverse road condition. At step 302, one or more sensors of the vehicle 102 detect a road condition. Data from the external sensors 122 of the vehicle 102 may be used by the road condition component 112 to detect adverse road conditions. In one embodiment, the external sensors 122 constantly or periodically scan for objects around the vehicle 102 that can be identified as a road condition. In an exemplary embodiment, the road condition component 112 analyzes data from the external sensors 122 for a single type of road condition such as a fire.

In other embodiments, the road condition component 112 analyzes data from the external sensors 122 for either a debris, a dysfunctional sign, or a decaying infrastructure. One possible purpose of this embodiment is to determine how unsightly a road is by quantifying the amount of trash (debris), broken signs (dysfunctional signs), and cracked buildings (decaying infrastructure). Another purpose for this embodiment may be to alert maintenance crews of road conditions that they are capable of improving.

In an exemplary embodiment, a density is generated as part of the road condition information based on the location of the road condition and the location of other road conditions. The density may be generated in any way. In one implementation of this embodiment, a density is generated for every location on a map based on the sum of one divided by the distance of each road condition from the location. In an exemplary embodiment, a density map may be created from the density information (see FIG. 10) and transmitted such that other vehicles 150 can receive the road condition density map. The density map may be useful in determining where the concentration of road conditions is high and low. In an exemplary embodiment, the other vehicles 150 determined to receive the density map are selected based on a payment received from the other vehicles 150.

Once objects are detected, at step 304, a detected road condition is identified and a road condition information is generated by the road condition component 112. In one embodiment, a machine learning algorithm is used to identify objects captured by the cameras 130 or external sensors 122. In an exemplary embodiment, objects around the vehicle 102 are spotted by the LiDAR 124 or radar 126 and then identified from image data from the camera 130.

At step 306, an effect of the road condition is determined on other vehicles 150. The effect of the road condition on other vehicles 150 is based on characteristics of the road condition and the other vehicle. For example, in a flooding road condition, the effect on other vehicles 150 may be based on the location of the flooding, the depth of flooding, the ground clearance of the other vehicle, and the direction of travel of the other vehicle. The effect on other vehicles 150 may also be determined by ability of the other vehicle to improve the road condition. For example, a waste pickup vehicle has the ability to improve a debris road condition.

The effect of the road condition may also be determined by the lane of the road that the road condition is in. The lane that the road condition is in may be determined in any way. In one embodiment, the navigation component 116, which is configured to determine the lane that the vehicle 102 is in, may be used to determine the lane of the road condition. In an exemplary embodiment, the images from cameras 130 are used to determine the lane of a road condition. The size and severity of a road condition may also determine the effect of a road condition on other vehicles 150. The size of a road condition may be determined in any way that quantifies the size of a road condition. In one embodiment, the size of a road condition is determined by the number of lanes that the road condition takes up. In an exemplary embodiment, the size of a debris road condition is the length, width, and height of a road condition. In an exemplary embodiment, the size of a road condition is the volume of space that the road condition takes up. The volume of the road condition may be determined by the cameras 130. The severity of a road condition is the quantity of danger created by the road condition for other vehicles 150. The severity of identified road conditions may be predetermined. For example, a large animal identified as a moose may be predetermined to have a higher severity than a small animal such as a rabbit because other vehicles 150 driving into a moose is more dangerous to other vehicles 150 than running into a rabbit.

At step 308, a subset of other vehicles 150 that will be affected by the road condition is determined. The subset of other vehicles 150 may be determined by any criteria. In one example, the subset of other vehicles 150 is selected based on their direction of travel and whether they are likely to drive into the road condition. In another example, the subset of other vehicles 150 is selected based on the other vehicles 150 that will be affected the most by the road condition. In this example, the other vehicles 150 that cannot drive across a flooding road condition are selected for the subset. In another example, the subset of other vehicles 150 is determined based on the other vehicles 150 that can improve the road condition. In another example, the subset of other vehicles 150 is determined based on the proximity of the other vehicles 150 to the road condition. In another example, the subset of other vehicles 150 is determined based on the effect of the road condition on the other vehicles 150.

At step 310, the road condition information is transmitted such that the road condition information is receivable by the subset of other vehicles 150. The road condition information may be transmitted by the vehicle communication component 120 of the vehicle 102. The road condition information may contain any amount of data about the road condition. In one example, only the position of the road condition is transmitted. In another example, the type of road condition, the lane of the road condition, and an image of the road condition are all transmitted.

In an exemplary embodiment, the road condition component 112 generates instructions to improve the road condition as part of the road condition information. Other vehicles 150 that receive the road condition information may follow the instructions to improve the road condition. The road condition information may include an image of the road condition to aid the other vehicles 150 in finding the road condition and improving the road condition.

In an exemplary embodiment, the vehicle 102 receives a confirmation from at least one of the other vehicles 150 that received instructions in the road condition information to improve a road condition. Also, in an exemplary embodiment, an instruction is sent to one or more of the other vehicles 150 in the road information to change the velocity of the other vehicles 150 as they approach the road condition.

Figure 4B:
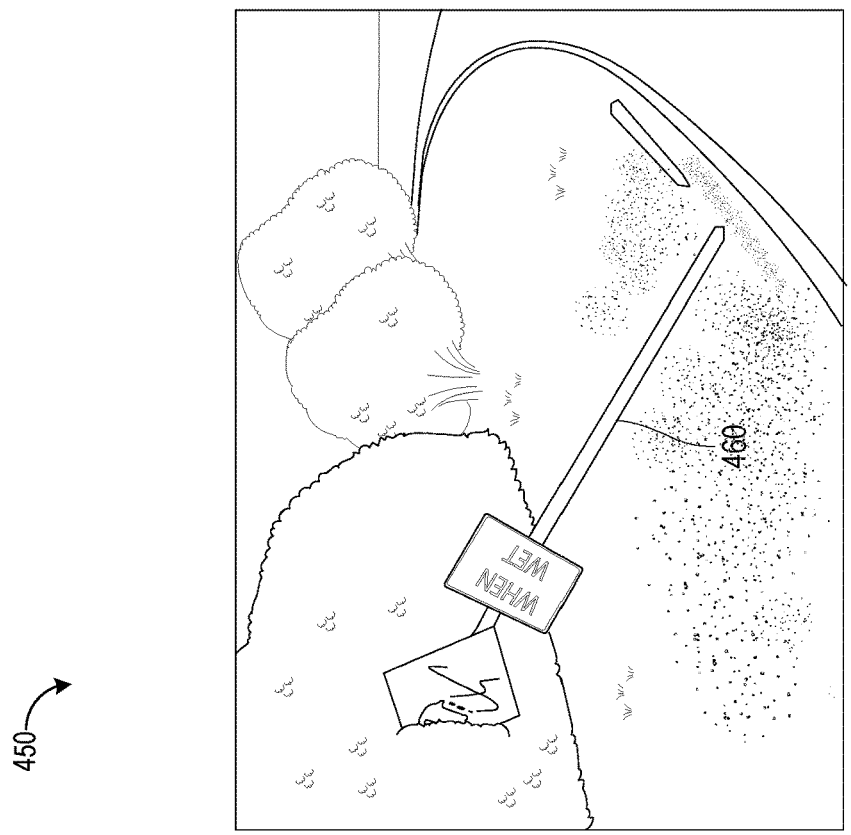
FIG. 4B illustrates an example of a broken sign road condition.
Figure 4A:
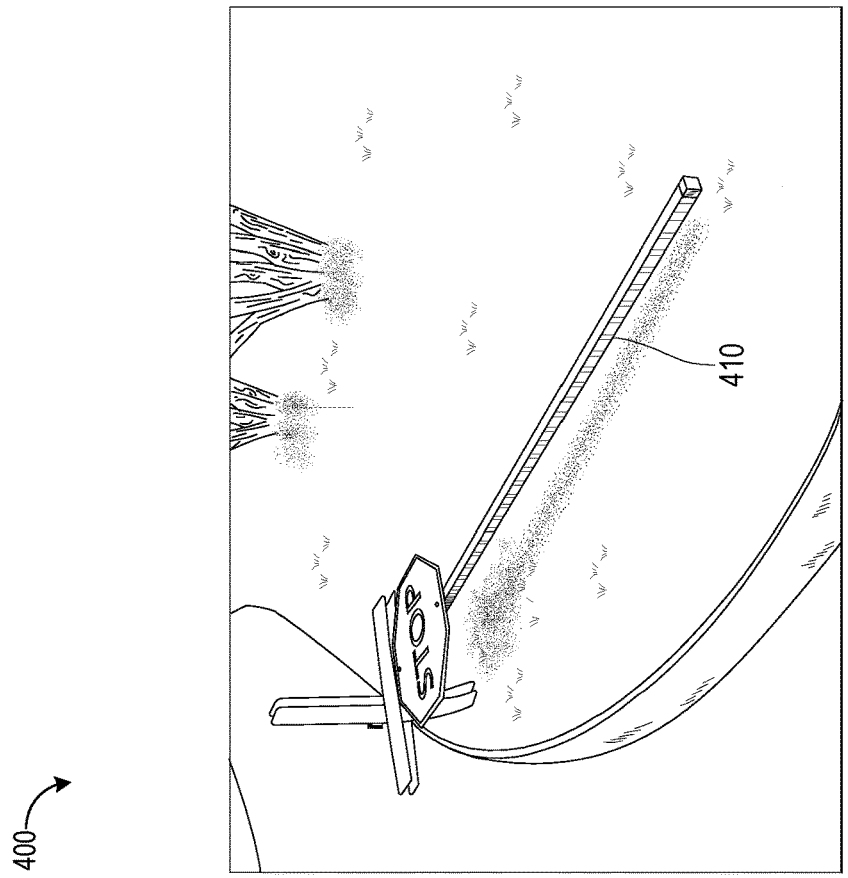
FIG. 4A illustrates an example of a broken sign road condition.

Referring to FIG. 4A, FIG. 4A is an illustration 400 of a broken sign that can be detected by the road condition component 112. The disclosed subject matter can be used to detect and identify signs that are broken or dysfunctional. Signs can be knocked over by the elements, by vehicle accidents, or through vandalism. Information of the broken signs, once identified, can be transmitted to vehicles that can remove and/or replace the broken sign.

A completely knocked over sign 410 can be detected by the camera 130 external sensor. In one embodiment, the road condition component 112 may use a machine learning algorithm to identify a road sign. Once the road sign is identified, the road condition component 112 can determine whether the sign has been knocked over. In most cases, signs stand straight up. In this embodiment, a sign that lies horizontally on the ground is presumed to be broken.

Referring to FIG. 4B, FIG. 4B is another illustration 450 of a broken sign that can be detected by the road condition component 112. Signs the tilt at an angle 460 may be presumed to be broken in additional to signs that are completely knocked over 410. There are a multitude of effects of a broken sign that may be determined for other vehicles 150. The effect may be a failure to relay information to other vehicles 150. The effect may be an unsightly road. The effect may be a blocked lane. And if the other vehicle has the ability to repair the sign, the effect may be an instruction to repair the broken sign.

Figure 5B:
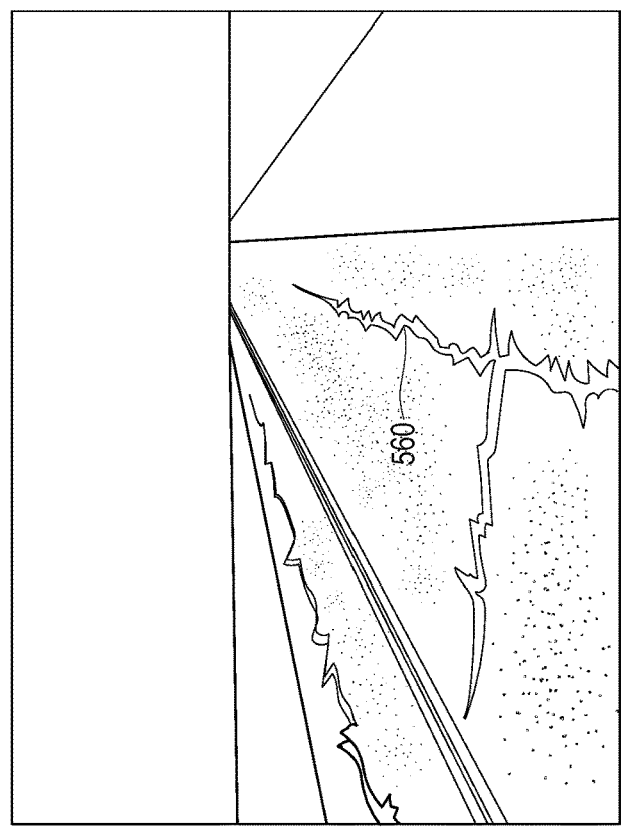
FIG. 5B illustrates an example of a decaying infrastructure road condition.
Figure 5A:
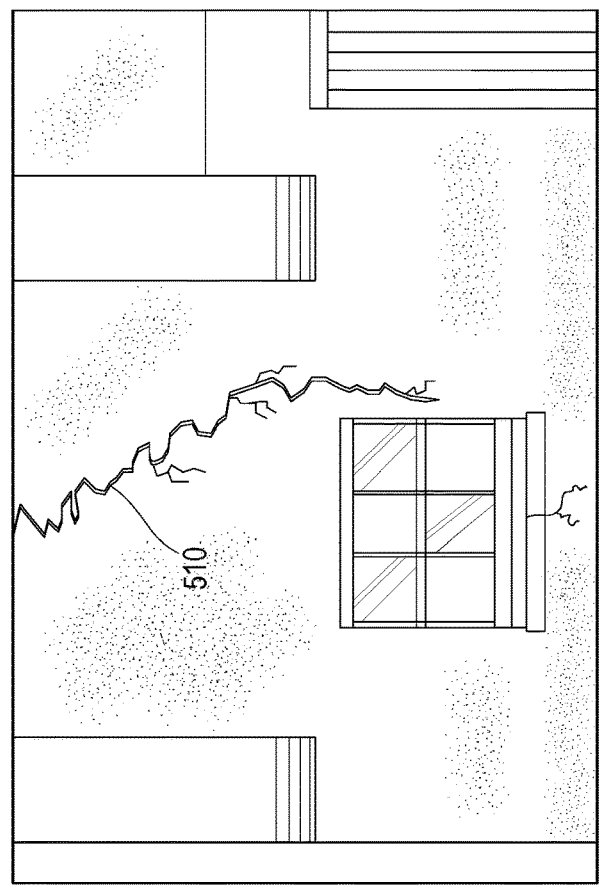
FIG. 5A illustrates an example of a decaying infrastructure road condition.

Referring to FIG. 5A, FIG. 5A is an illustration 500 of a decaying infrastructure road condition. Decaying infrastructure on or near a road will often manifest itself in cracks in buildings 510 and roads. The disclosed subject matter can automatically identify and transmit information related to decaying infrastructure that may otherwise go unnoticed. The effect of a broken building on the side of a road on other vehicles 150 may be a more unsightly road. Additionally, if the other vehicles 150 have the ability to make improvements to the cracking infrastructure, the effect may be an instruction to improve the crack in the building 510.

Referring to FIG. 5B, FIG. 5B is another illustration 550 of a decaying infrastructure road condition. A crack on a road 560, in addition to being unsightly, may have the effect of decreased traction for other vehicles 150. A subset of other vehicles 150 that may be selected to receive a cracked road 520 alert may be other vehicles 150 with thin tires.

Figure 6:
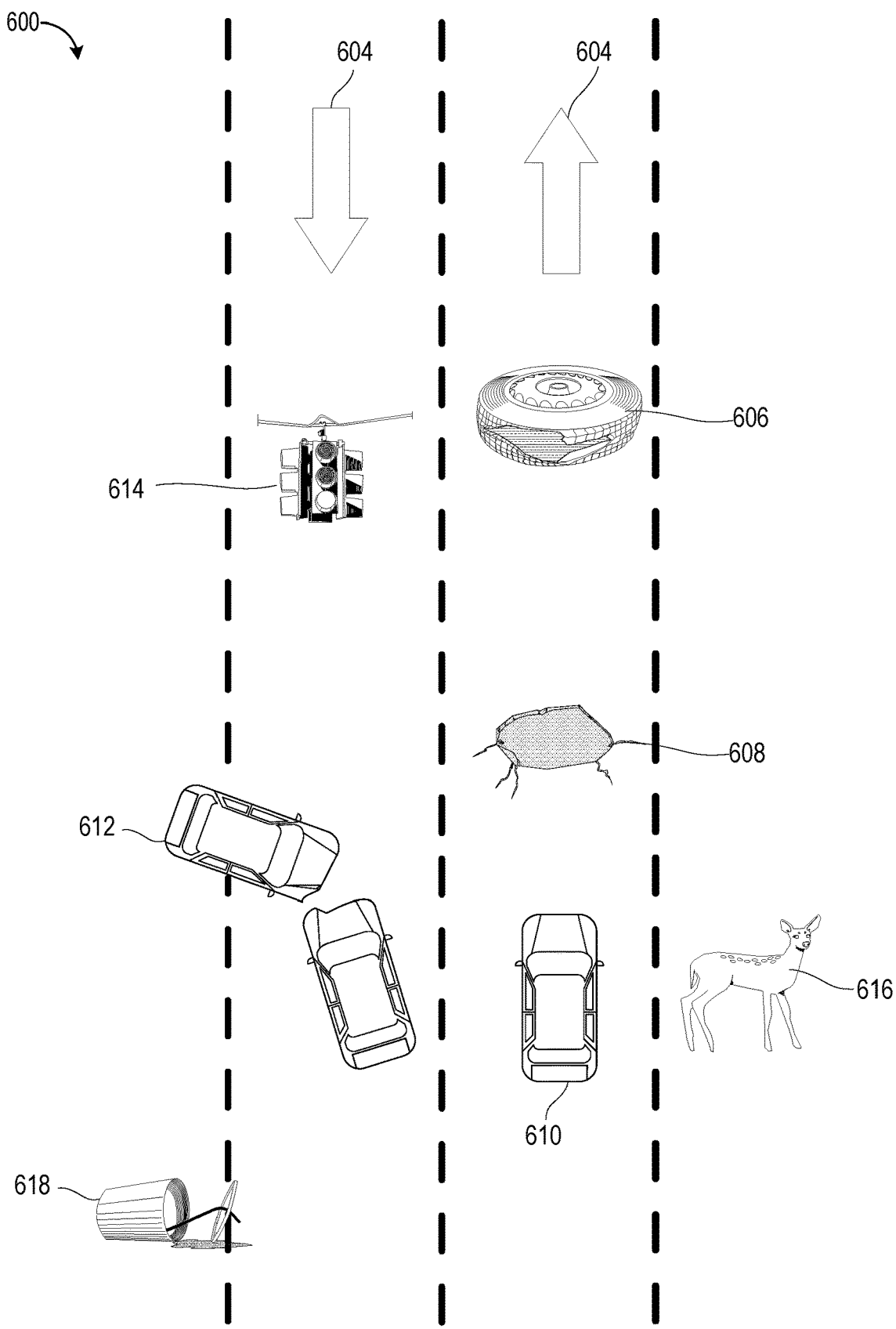
FIG. 6 illustrates examples of lane specific road conditions on a road.

Referring to FIG. 6, FIG. 6 is an illustration 600 of a multitude of road conditions that are lane specific on a road. The road condition component 112 may be configured to identify many types of different road conditions at once. In addition to the location of a road condition, the lane a road condition is on or near may have the largest effect on other vehicles 150 in many cases. Regardless of where a road condition is, if the road condition is in the same lane as an other vehicle 150, the other vehicle will eventually encounter the road condition. The direction of travel of a lane 604 may be considered in determining the effect of a road condition on other vehicles 150. Even where a road condition is close to an other vehicle 150, the other vehicles 150 will only encounter the road condition if the other vehicle is travelling in the same direction as the lane that the road condition is in or near.

For example, an other vehicle 150 will only encounter debris 606 on the road if the other vehicle is travelling in the direction of the debris 606. Debris 606 in a lane may be any inanimate object on the road. Debris may be detected by the LiDAR 124, radar 126, cameras 130, and ultrasonic sensors 132 on the vehicle 102. The effect of debris in a lane on other vehicles 150 may be determined by the size of the debris, the size of the other vehicle, the lane the debris is in, and the direction of travel of the other vehicle.

Like debris 606, an other vehicle 150 may only encounter a pothole 608 if it is in the same lane as the pothole 608 and travelling toward the pothole 608. Therefore, the effect of the pothole 608 on other vehicles 150 will be dependent on the lane that the other vehicles 150 are in. The subset of vehicles that are selected to receive a road condition information of a pothole 608 can be other vehicles 150 such as vehicle 610 that are travelling toward the road condition.

The speed of vehicles on the road creates a traffic road condition if the speed of the vehicles is slower than the unimpeded speed of the road. The unimpeded speed of the road may be a predetermined speed for every location on a road. If the vehicle 610 is driving slower than the unimpeded speed of the road, then it creates a blocking vehicle road condition. The effect of a vehicle 610 that is slow moving on other vehicles 150 depends on the likelihood that the other vehicles 150 will overtake the vehicle 610 that is slow moving and have to slow down themselves.

A vehicle accident 612 is the identification of vehicles in or near the road that have been involved in accidents. Because the vehicle 610 is on the opposite lane of travel as the vehicle accident 612, the effect of the vehicle accident 612 on the vehicle 610 is smaller than other vehicles 150 that may be travelling toward the vehicle accident 612. A signaling light 614 may be employed to transmit road condition information to the subset of other vehicles 150 that are travelling toward the vehicle accident 612.

Road conditions that are detected on the side of the road may still have an effect on other vehicles 150 near the road condition. For example, animals 616 on the side of the road might move onto the road and create a dangerous hazard for vehicles. The effect of the animal 616 road condition is less lane specific than stationary road conditions like the pothole 608. However, the assumption may be made that the vehicle 610 is faster than an animal 616. Therefore, the animal 616 would have a small effect on the vehicle 610 once the vehicle 610 is past the animal 616, as shown in FIG. 6. Trash 618 on the side of the road has an effect on other vehicles 150 that can see the trash 618 as being unsightly. The subset of other vehicles 150 that may be selected to receive the trash 618 road condition information may be any other vehicle 150 that is in sight of the trash 618. Trash may also have an effect on trash pickup vehicles that have the ability to clean up the trash 618.

Figure 7:
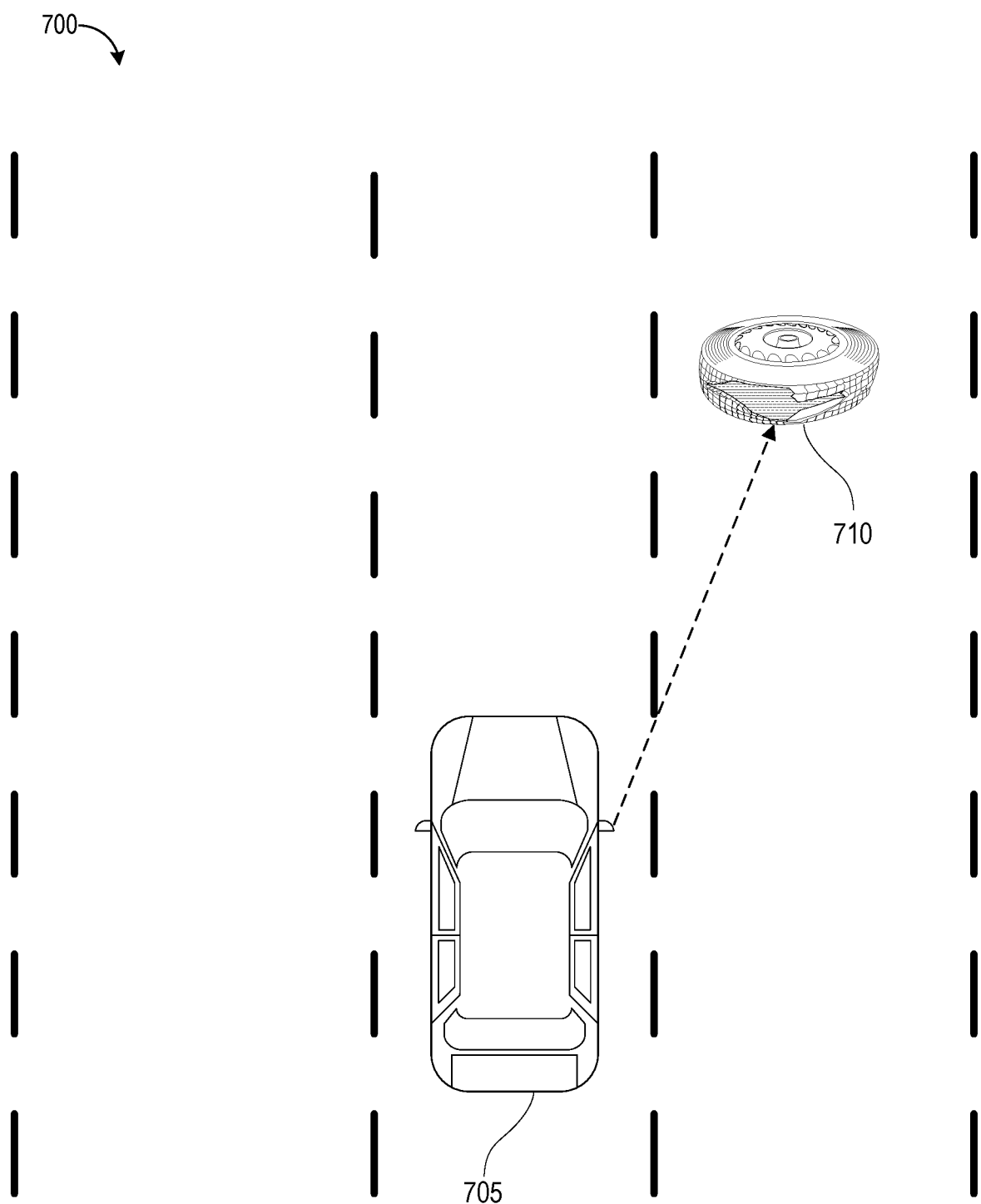
FIG. 7 illustrates an example of identifying a road condition.

Referring to FIG. 7, FIG. 7 is an illustration 700 of a vehicle 705 identifying a road condition 710. As shown from the dotted line coming from the vehicle 705, external sensors 122 of the vehicle 705 detect an object in the road. The road condition component 112 identifies the road condition 710 as tire debris on the road and generates a road condition information. The effect of the road condition 710 on other vehicles 150 may then be determined. In one embodiment the effect of known objects on other vehicles 150 is predetermined. In the case shown in FIG. 7, the effect of the road condition 710 will be large for other vehicles 150 travelling in the lane of the tire debris because it may be predetermined that the road condition 710 can cause substantial damage to a vehicle that encounters the road condition 710. Other vehicles 150 in the lane next to the road condition 710 may also be affected by the road condition 710 if it is predetermined that the road condition 710 may be pushed into another lane. A subset of other vehicles 150 selected to receive a transmission of the tire debris information may be the other vehicles 150 that are travelling toward the road condition 710 in the lane of the tire debris and the lanes next to the road condition 710.

Figure 8:
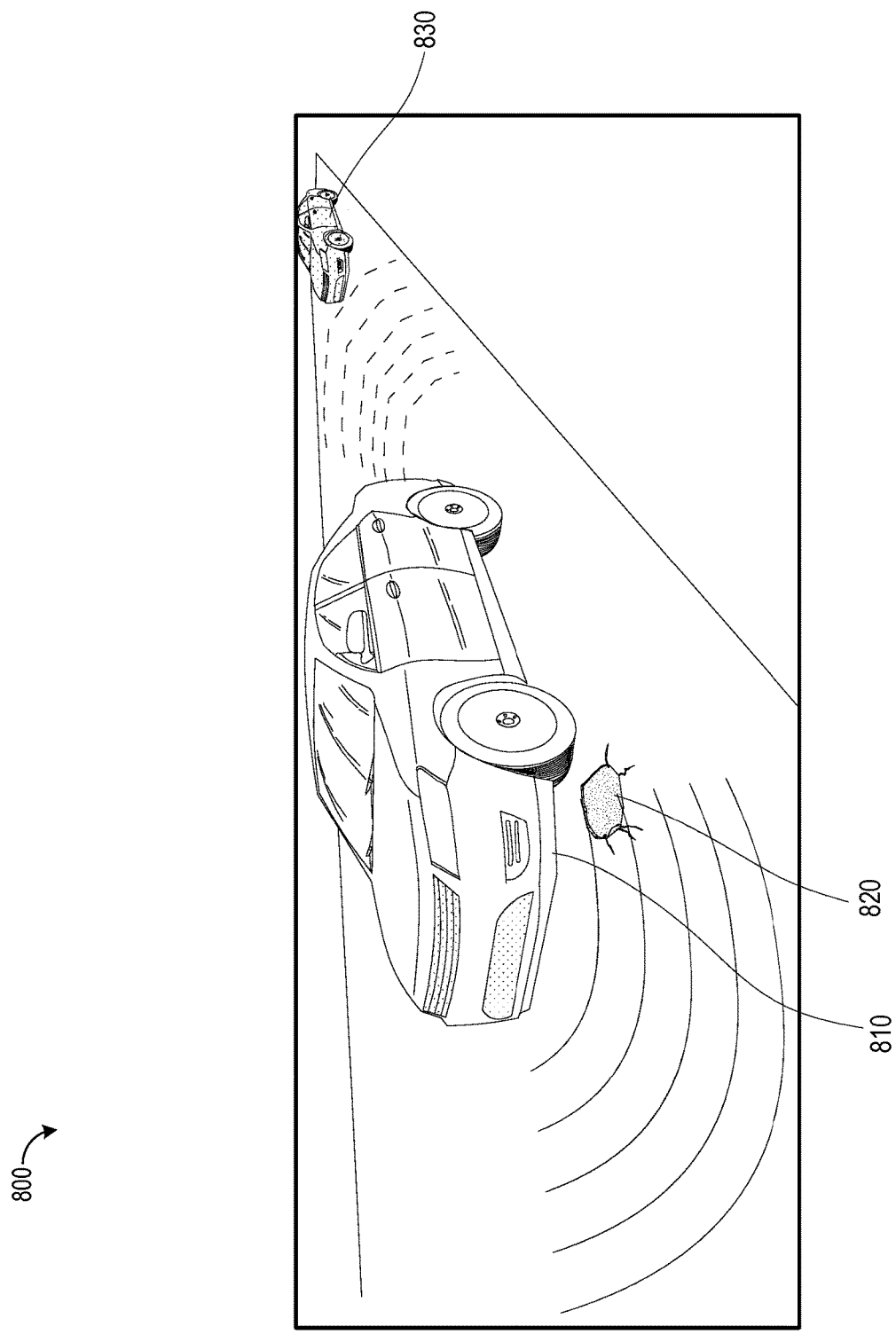
FIG. 8 illustrates an example of transmitting road condition information to one or more nearby vehicles.

Referring to FIG. 8, FIG. 8 is an illustration 800 of a leading vehicle 810 sharing a road condition information with a following vehicle 830 that will be affected by the road condition. In this case, the road condition is a pothole 820. The data from LiDAR 124 and camera 130 may be used to detect the pothole 820. The pothole component 205 may identify a pothole 820 from a depression in the road by analyzing data from LiDAR 124. Alternatively, the pothole component 205 may identify a pothole 820 from an image from the camera 130 based on a machine learned algorithm. The machine learned algorithm may learn to identify potholes from camera 130 images by analyzing a multitude of images of potholes The road condition component 112 generates a road condition information after identifying the road condition 820 as a pothole.

Next, an effect on other vehicles 150 may be determined. The effect on other vehicles 150 may be based on the dimensions of the pothole 820 and the characteristics of other vehicles 150. If the dimensions of the pothole 820 are relatively small, the effect of the pothole 820 on the following vehicle 830 will be small as well. If the other vehicle 150 has a low ground clearance, for example, the effect of the pothole 820 will be greater. A subset of other vehicles 150 that will be affected by the pothole 820 may be determined by any criteria including the effect on other vehicles 150. In one example, the subset of other vehicles 150 may be determined as the other vehicles 150 that would receive a minimum amount of damage from the pothole 820. In another example, the subset of other vehicles 150 may be determined by other vehicles 150 that are within a minimum distance to the pothole 820 and driving towards the pothole 820. In another example, the subset of other vehicles 150 may be determined by the vehicles within a minimum distance of the pothole 820 and travelling in the same lane as the pothole 820 toward the pothole 820.

If the following vehicle 830 is determined to be in the subset of other vehicles 150 that will be affected by the pothole, an instruction from the vehicle communication component 120 to transmit the pothole information will be executed so that the pothole information will be receivable by the following vehicle 830. The transmission may be made in any available medium, including but not limited to, Cellular, wife, Bluetooth™, and near field communication. In one example, the transmission is sent to a cell tower, which transmits the pothole information to the following vehicle 830. In another example, the transmission is made to a network server, that cause an electronic sign, readable by the following vehicle 830, to display a message informing the following vehicle 830 of the pothole 820. The pothole information may also include an instruction for the following vehicle 830 to slow down. The following vehicle 830 may also send a confirmation back to the leading vehicle 810.

Figure 9:
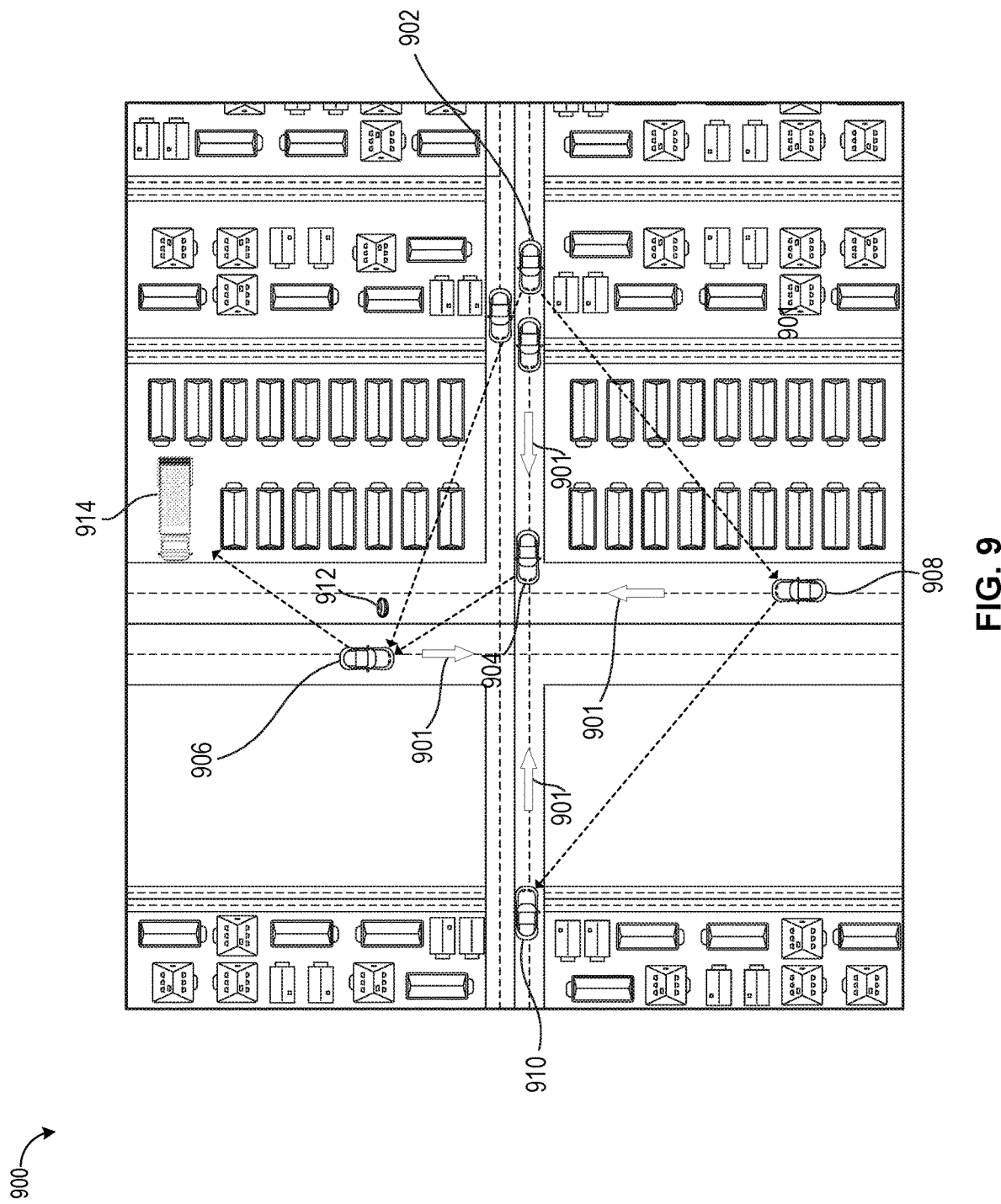
FIG. 9 illustrates an example of cross-talk between vehicles that are transmitting road condition information.

Referring to FIG. 9, FIG. 9 is an illustration 900 of cross-talk between multiple vehicles that are transmitting road condition information regarding various road conditions. The dotted lines in the illustration 900 represent vehicles 102 transmitting road condition information to other vehicles 150. The direction of travel 901 indicates the direction that vehicles 102 are travelling in the illustration 900. The blocking vehicle component 230 of vehicle 902 detects slow moving vehicles in front of vehicle 902 and generates road condition information. An effect on other vehicles 150 is determined. In this case, the slow moving vehicles would have the effect of slowing other vehicles 150 down. A subset of other vehicles 150 that will be affected by the slow moving vehicles are determined. In this case, other vehicles 150 within a minimum proximity and traveling toward the slow moving vehicles are determined to be in the subset of other vehicles 150. Vehicle 904 is not in the subset of other vehicles 150 for the slow moving vehicle road condition because vehicle 904 is moving away from the slow moving vehicles. As shown by the dotted lines from vehicle 902 to vehicle 906 and vehicle 908, vehicle 906 and vehicle 908 are determined to be in the subset of other vehicles 150 because they are within the minimum proximity and traveling toward the slow moving vehicles. As shown by the dotted line from vehicle 908 to vehicle 910, vehicle 908 relays the transmission from vehicle 902 to vehicle 910. Vehicle 906, vehicle 908, and vehicle 910 may send a confirmation transmission receivable, by vehicle 902.

In the identification of a different road condition by a different vehicle 102, the blocking vehicle component 230 of vehicle 904 determines, at the current velocity of vehicle 906, that vehicle 906 would block or hit vehicle 904. Vehicle 906 is determined to be in the subset of other vehicles 150 that may be affected by the road condition. As shown by the dotted line from vehicle 904 to vehicle 906, vehicle 904 transmits a road condition information to vehicle 906, informing vehicle 906 that the two vehicles will meet in the intersection. An instruction to vehicle 906 may be included in the road condition information for vehicle 906 to slow down and yield to vehicle 904. Vehicle 906 may send a confirmation to vehicle 904 that it will yield to vehicle 904.

In the identification of a different road condition by a different vehicle 102, the debris component 215 of vehicle 906 identifies a tire debris 912 in the road. The effect on the tire debris 912 on other vehicles 150 is an increased danger to the other vehicles 150 because of the large size of the tire debris 912. The waste cleanup truck 914 is determined to be in the subset of other vehicles 150 because it has the ability to improve the tire debris 912 road condition. As shown by the dotted line from vehicle 906 to waste cleanup truck 914, vehicle 906 transmits an information to the waste cleanup truck 914 with instructions to pick up the tire debris 912. The waste cleanup truck 914 may send vehicle 906 a confirmation that it will pick up the tire debris 912. Vehicle 906 may also send a road condition information to the other vehicles 150 that are in increased danger because of the tire debris.

Figure 10:
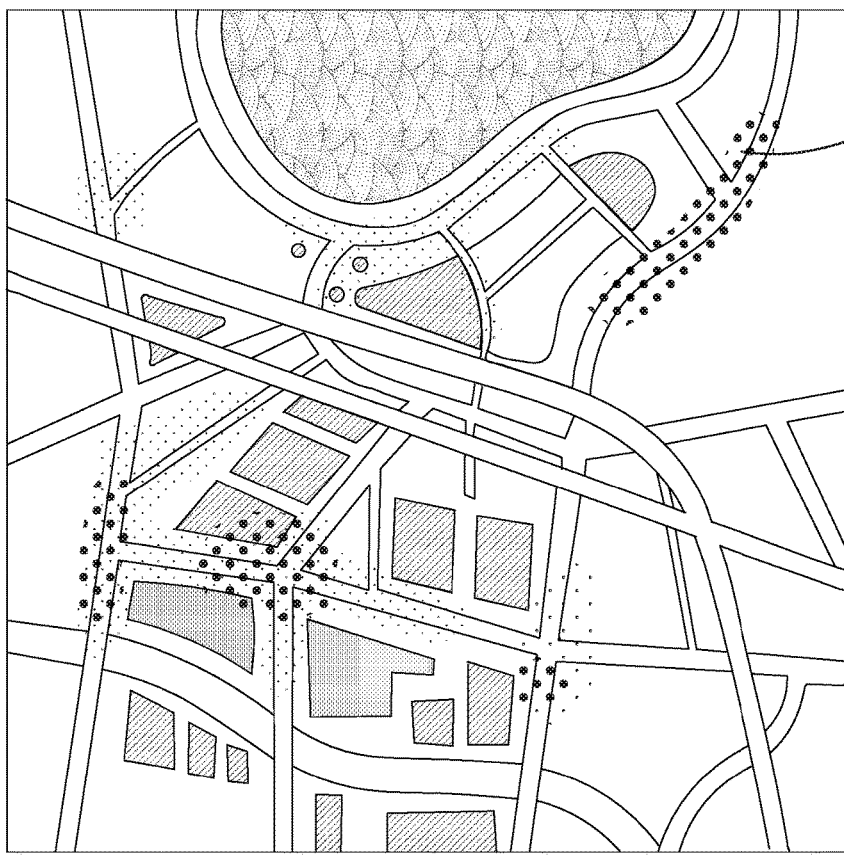
FIG. 10 illustrates an example of a density map of road conditions.

Referring to FIG. 10, FIG. 10 is an illustration of a density map 1000 of road conditions. A density map 1000 of road conditions illustrates the concentration of road conditions at one or more locations. The density map 1000 may illustrate the concentration of any individual road condition, a set of road conditions, or all road conditions. For example, the density map 1000 may illustrate the concentration of potholes on a map. In another example, the density map 1000 may illustrate the concentration of graffiti on a map. In another example, the density map may illustrate the concentration of dysfunctional signs on a map. When the density is determined for every location on a map, a density map 1000 may be produced, as shown in FIG. 10. The density map 1000 is used to condense multiple road condition information into a concise illustration. Accordingly, the density map 1000 may be used to quickly identify areas on map that have unusually high concentrations of road conditions. Repair crews may be sent to locations on a map that have greater than a minimum amount of density of road conditions on a density map 1000. The density map 1000 may be used to quickly plot a course that avoids areas with high concentrations of road conditions. The density map 1000 may be used to predict where maintenance crews are likely to find road conditions that the maintenance crew can improve. A density of road conditions at a location 1010 may be determined in many different ways. In one embodiment, the density at a location 1010 for a single road condition is determined by the quotient of dividing one by the distance of the location 1010 from the road condition. The density at a location 1010 for many road conditions may be found by adding the individual densities of the many road conditions at the location 1010. In an exemplary embodiment, a subset of other vehicles 150 is determined to receive the density map information based on a payment received from the other vehicles 150. Also in an exemplary embodiment, maintenance vehicles are determined to be in the subset of other vehicles 150 to always receive density map information. Also in an exemplary embodiment, other vehicles 150 that a plotting a course through an area are determined to be the subset of other vehicles 150 that receive density map information.

Figure 11:
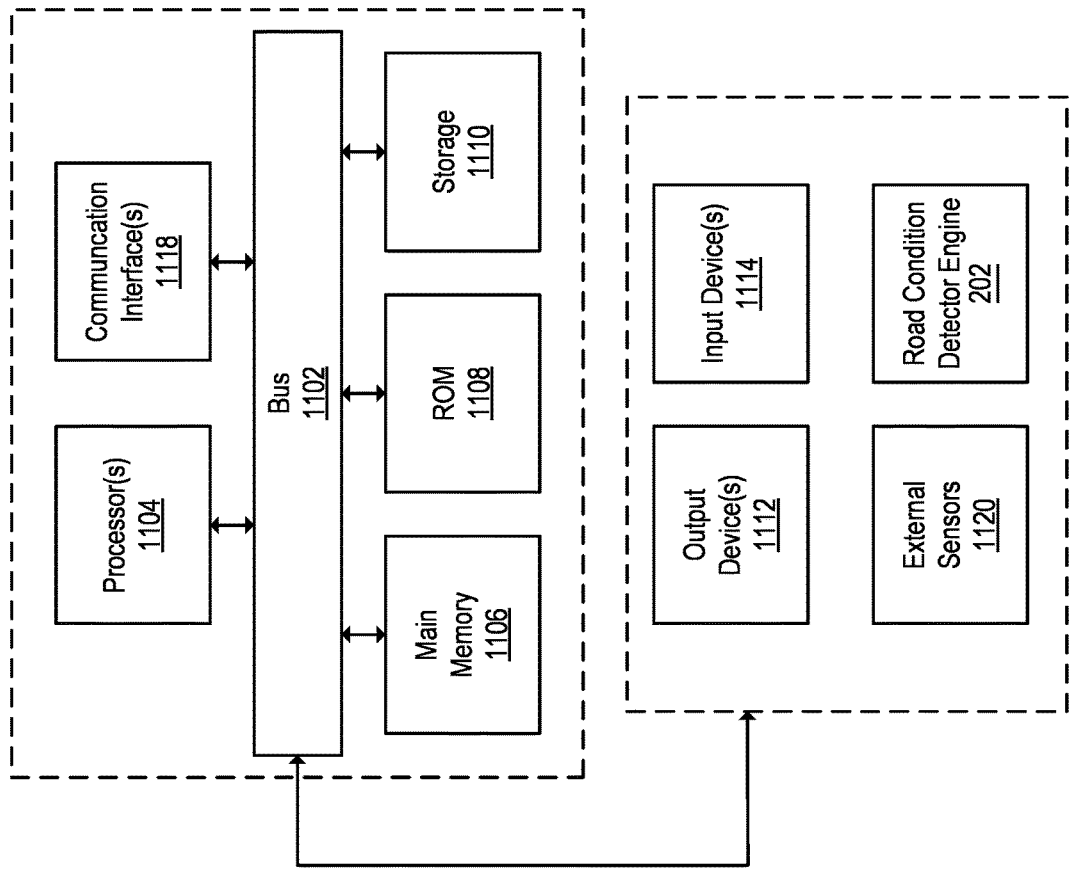
FIG. 11 is a schematic illustrating the computing components that may be used to implement various features of embodiments described in the present disclosure.

FIG. 11 is a block diagram that illustrates a computer system 1100 upon which any embodiments of the vehicle computer 106 may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to an output device 1112, such as a cathode ray tube (CRT) or LCD display (or touch screen), for displaying information to a computer user. An input device 1114, including alphanumeric and other keys, is coupled to bus 1102 for communicating information and command selections to processor 1104. The external sensors 1120 of the vehicle may be coupled to the bus to communicate information on the environment outside the vehicle 102. Data from the external sensors 1120 is used directly by the road condition detector engine 202 to detect and identify road conditions. Another type of user input device is cursor control, such as a mouse, a trackball, or cursor direction keys for communicating direction information and command selections to processor 1104 and for controlling cursor movement on an output device 1112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computer system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors 1104. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1100 may implement the techniques described herein using customized hard-wired logic, one or more ASICs or FPGAs, firmware and/or program logic which in combination with the computer system 1100 causes or programs the computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a component control. A component control local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may retrieves and executes the instructions. The instructions received by main memory 1106 may optionally be stored on storage device 1110 either before or after execution by processor 1104.

The computer system 1100 also includes a communication interface 1118 coupled to bus 1102. Communication interface 1118 provides a two-way data communication coupling to one or more network links that are connected to one or more local networks. For example, communication interface 1118 may be an integrated services digital network (ISDN) card, cable component control, satellite component control, or a component control to provide a data communication connection to a corresponding type of telephone line. As another example, communication interface 1118 may be a local area network (LAN) card to provide a data communication connection to a compatible LAN (or WAN component to communicated with a WAN). Wireless links may also be implemented. In any such implementation, communication interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet". Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution. Each of the processes, methods, and algorithms described in the preceding sections may be embodied in, and fully or partially automated by, code modules executed by one or more computer systems 1100 or computer processors 1104 comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The various operations of example methods described herein may be performed, at least partially, by one or more processors 1104 that are temporarily configured (e.g., by software) or permanently configured to perform the relevant operations. Similarly, the methods described herein may be at least partially processor-implemented, with a particular processor 1104 or processors 1104 being an example of hardware. For example, at least some of the operations of a method may be performed by one or more processors 1104. Moreover, the one or more processors 1104 may also operate to support performance of the relevant operations in a "cloud computing" environment or as a "software as a service" (SaaS). For example, at least some of the operations may be performed by a group of computers (as examples of machines including processors 1104), with these operations being accessible via a network (e.g., the Internet) and via one or more appropriate interfaces (e.g., an Application Program Interface (API)).

The performance of certain of the operations may be distributed among the processors 1104, not only residing within a single machine, but deployed across a number of machines. In some example embodiments, the processors 1104 may be located in a single geographic location (e.g., within a home environment, an office environment, or a server farm). In other example embodiments, the processors 1104 may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method comprising:
   detecting, by a detecting vehicle, using one or more sensors, a road condition;
   identifying the road condition using a component;
   generating road condition information by generating a map comprising a density of the road condition with other road conditions based on a location of the road condition and locations of the other road conditions, wherein the map illustrates a concentration of the road condition with the other road conditions;
   determining an effect of the road condition on other vehicles;
   determining a second vehicle within a threshold proximity of the road condition;
   determining a probability of the road condition moving based on a characteristic of the road condition and a likelihood of a third vehicle hitting the road condition;
   estimating an effect of the road condition on the second vehicle; and
   selectively transmitting, by the detecting vehicle to the second vehicle, first instructions to change a velocity of the second vehicle while the second vehicle is approaching the road condition, based on the estimated effect,
   a weight, a ground clearance, and a wheel size of the second vehicle.

2. A method of claim 1, further comprising:
   determining a subset of the other vehicles that will be affected by the road condition; and
   transmitting the road condition information such that the road condition information is receivable by the subset of the other vehicles.

3. The method of claim 2, wherein determining the effect of the road condition on the other vehicles comprises determining a lane of the road condition;
   further comprising determining at least one of a size or a severity of the road condition;
   wherein the subset of the other vehicles is selected based at least on one of a proximity of the other vehicles to the road condition, the effect of the road condition on the other vehicles, and an ability of the other vehicles to improve the road condition.

4. The method of claim 3, wherein the road condition information further comprises instructions to improve the road condition and a picture of the road condition; and
   further comprising receiving a confirmation from at least one of the other vehicles.

5. A method of claim 2, further comprising:
   transmitting the map to the determined subset of the other vehicles.

6. A method of claim 1, further comprising:
   determining a fourth vehicle that has a capability of improving the road condition;
   generating second instructions to improve the road condition; and
   transmitting the second instructions to the fourth vehicle to improve the road condition.

7. A method of claim 1, wherein the selectively transmitting of the first instructions comprises causing an electronic sign to be generated and displayed to the second vehicle to inform the second vehicle regarding the road condition and instruct the second vehicle to slow down.

8. The method of claim 1, further comprising:
   selectively transmitting, by the detecting vehicle to the second vehicle, second instructions to remedy the road condition based on the density of the road condition, wherein the selectively transmitting of the second instructions comprises transmitting, to the second vehicle, the second instructions to remedy the road condition in response to the density of the road condition exceeding a threshold density.

9. The method of claim 1, wherein the road condition comprises a cracked bridge fence.

10. The method of claim 1, wherein the determining of the probability of the road condition moving comprises determining an extent to which a crack will propagate based on an existence of rain.

11. The method of claim 1, wherein the selectively transmitting the first instructions is further based on a braking distance.

12. The method of claim 1, wherein the selectively transmitting comprises transmitting the first instructions to any other vehicles having a wheel size smaller than a threshold diameter without transmitting the first instructions to any vehicles having the wheel size equal or greater than the threshold diameter.

13. The method of claim 1, wherein the one or more sensors comprise ultrasonic sensors and the detecting, using the one or more sensors, the road condition comprises emitting sound pulses and measuring respective times that the emitted sound pulses are reflected back.

14. The method of claim 1, wherein the road condition comprises tire debris, and the selectively transmitting is based on a size of the tire debris.

15. An apparatus comprising:
one or more sensors on a detecting vehicle configured to detect a road condition; and
a computer on the detecting vehicle, the computer configured to:
identify the road condition;
generate a road condition information by generating a map comprising a density of the road condition with other road conditions based on a location of the road condition and locations of the other road conditions, wherein the map illustrates a concentration of the road condition with the other road conditions;
determine an effect of the road condition on other vehicles;
determine a second vehicle within a threshold proximity of the road condition;
determine a probability of the road condition moving based on a characteristic of the road condition and a likelihood of a third vehicle hitting the road condition;
estimate an effect of the road condition on the second vehicle; and
selectively transmit, from the computer of the detecting vehicle to the second vehicle, first instructions to change a velocity of the second vehicle while the second vehicle is approaching the road condition, based on the estimated effect,
a weight, a ground clearance, and a wheel size of the second vehicle.

16. The apparatus of claim 15, wherein the determining of the effect of the road condition on the other vehicles further comprises:
a determination of a lane of the road condition; and
a determination of at least one of a size or a severity of the road condition.

17. The apparatus of claim 15, the computer further configured to determine a subset of the other vehicles that will be affected by the road condition and the detecting vehicle further configured to transmit the road condition information such that the road condition information is receivable by a subset of other vehicles.

18. The apparatus of claim 17, wherein the subset of the other vehicles is selected based at least on one of a proximity of the other vehicles to the road condition, the size of the effect of the road condition on the other vehicles, and an ability of the other vehicles to improve the road condition.

19. A non-transitory computer readable storage medium in a detecting vehicle having data stored therein representing a software executable by a computer, the software comprising instructions that, when executed, cause the detecting vehicle to perform:
detecting, using one or more sensors, a road condition;
identifying the road condition using a component;
generating road condition information by generating a map comprising a density of the road condition with other road conditions based on a location of the road condition and locations of the other road conditions, wherein the map illustrates a concentration of the road condition with the other road conditions;
determining an effect of the road condition on other vehicles;
determining a second vehicle within a threshold proximity of the road condition;
determining a probability of the road condition moving based on a characteristic of the road condition and a likelihood of a third vehicle hitting the road condition;
estimating an effect of the road condition on the second vehicle; and
selectively transmitting, by the detecting vehicle to the second vehicle, first instructions to change a velocity of the second vehicle while the second vehicle is approaching the road condition, based on the estimated effect,
a weight, a ground clearance, and a wheel size of the second vehicle.

20. The non-transitory computer readable storage medium in the detecting vehicle of claim 19, wherein determining the effect of the road condition on other vehicles comprises determining a lane of the road condition; and the instructions further cause the detecting vehicle to perform determining at least one of a size or a severity of the road condition.

* * * * *